March 22, 1932.  D. E. HENNESSY  1,850,266
ELEVATING TRUCK
Filed July 23, 1929   2 Sheets-Sheet 2

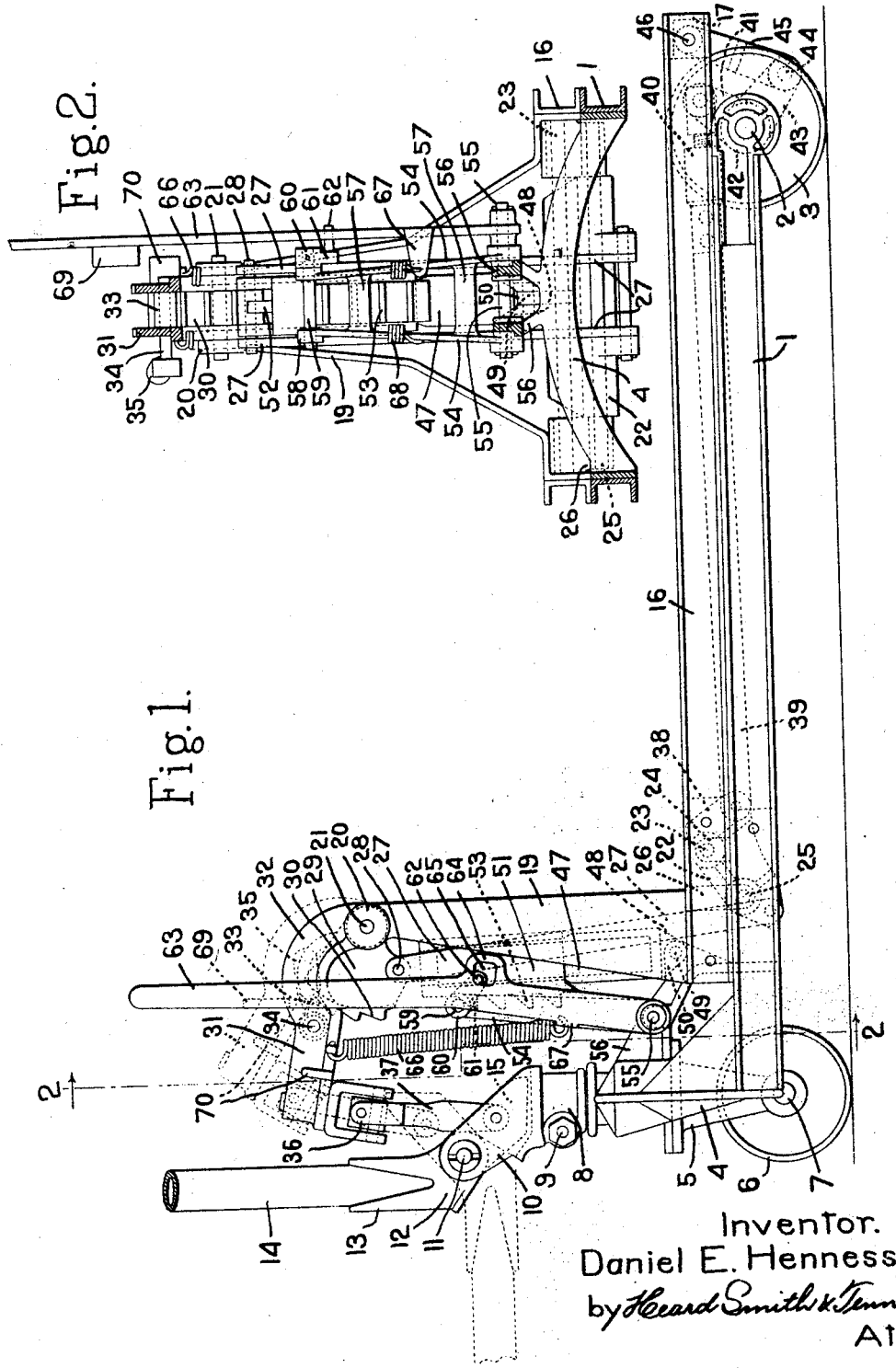

Inventor.
Daniel E. Hennessy
by Heard Smith & Tennant.
Attys.

Patented Mar. 22, 1932

1,850,266

UNITED STATES PATENT OFFICE

DANIEL E. HENNESSY, OF WATERTOWN, MASSACHUSETTS, ASSIGNOR TO LEWIS-SHEPARD COMPANY, OF WATERTOWN, MASSACHUSETTS, A CORPORATION OF MASSACHUSETTS

ELEVATING TRUCK

Application filed July 23, 1929. Serial No. 380,362.

This invention relates to improvements in elevating trucks comprising load supporting means, means for raising the load supporting means, and means for locking the load supporting means in raised position, preferably operable by a vertically swinging tongue.

One of the objects of the invention is to provide an easily releasable locking means, which will be subject to a minimum amount of wear, comprising relatively movable co-operating locking members upon the load supporting means and a stationary portion of the truck having respectively a shoulder and a rotatable member to engage said shoulder, with means for rotating the rotatable member in a direction to cause the rolling contact with said shoulder to release the same therefrom.

A further object of the invention is to provide an easily releasable locking means of the character above specified for an elevating truck in which the load supporting means is raised step by step and the rotatable member engaged successively with the teeth of a ratchet, preferably movable with the load supporting means.

Another object of the invention is to provide an elevating truck of the character specified with a hand-operated device for releasing the locking means, the hand-operated device being of the character which is easily accessible to the operator, thereby avoiding the necessity of the usual foot pedal for releasing the lever, which sometimes is inadvertently actuated when the tongue is down and causes the flying tongue to injure the operator.

A further object of the invention is to provide means for preventing actuation of the releasing lever unless the tongue is in a vertical position where it cannot fly to injure the operator.

Another object of the invention is to provide an elevating truck with lever mechanism for raising the load supporting means in which the lever mechanism is so constructed as to provide a maximum range of lifting commensurate with the relative proportions of the lifting levers.

A further object of the invention is to provide lifting mechanism symmetrically arranged with respect to the longitudinal axis of the truck, together with dash pot mechanism also acting symmetrically with relation to said axis, and preferably located in the plane of the longitudinal axis of the truck, thereby avoiding twisting strains to the frame and load supporting means.

Another object of the invention is to provide means located substantially axially of the truck to lock the load supporting means, when elevated or at each step of elevation, combined with cushioning means also located in the longitudinal axial plane of the truck. This is accomplished in the present invention by providing a dash pot located centrally of the width of the truck having its piston connected to the load supporting means and provided with a ratchet and a dog mounted upon the frame to engage said ratchet, and preferably provided with the easily releasable locking means above described.

A further object of the invention is to provide an elevating truck in which the front end of the load supporting means is carried by a lever fulcrumed upon the frame and operable to raise the front end of the load supporting means substantially vertical, with improved mechanism for raising the rear end of the load supporting means comprising a bell crank lever having an upwardly extending arm connected to said supporting lever and movable thereby across the vertical plane of the rear axle and a substantially horizontal lever connected by a vertical link to the rear end of the load supporting means and movable substantially vertically upon forward movement of the upwardly extending arm of said bell crank lever, thereby providing a maximum and substantially vertical lift for the rear end of the load supporting means.

A further object of the invention is to provide a more stable truck than those of the type described which have heretofore been constructed.

These and other objects and features of the invention will more fully appear from the following description and the accompanying drawings and will be particularly pointed out in the claims.

In the drawings:

Fig. 1 is a side elevation of an elevating truck embodying the preferred form of the invention;

Fig. 2 is a vertical sectional view on line 2—2 Fig. 1, viewed from the left toward the right; and, Fig. 3 is a plan view of the truck illustrated in Fig. 1, the tongue being illustrated in horizontal section.

Figure 3:
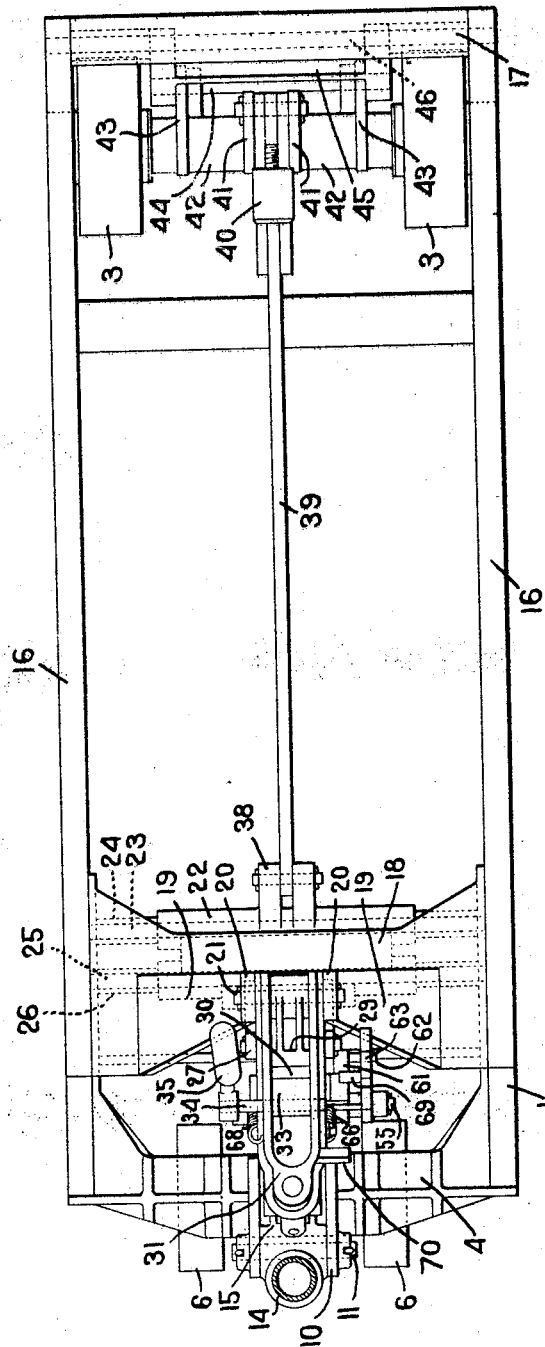

The invention is illustrated herein as embodied in an elevating truck of the type disclosed in the patent granted to Lewis-Shepard Company assignee of Ralph M. Lovejoy February 20, 1923, No. 1,445,838.

The elevating truck illustrated in the accompanying drawings comprises a frame having side bars 1 connected at their rear ends by a rear axle 2 upon which a pair of wheels 3 are mounted within and in proximity to the side bars 1, preferably upon roller bearings, and connected at its front end by an arch-shaped head 4 in which the steering mechanism is mounted. The steering mechanism comprises the usual vertical steering post having at its lower ends downwardly extending yoke arms 5 with steering wheels 6 mounted upon an axle 7 and located on the outside of the steering arms. This construction provides a wide wheel base both fore and aft. A split collar 8, which is rigidly clamped upon the upper end of the steering post by a bolt 9, is provided with a pair of upwardly and forwardly extending ears 10 in the upper ends of which a shaft 11 is mounted which forms the fulcrum for the steering tongue. The steering tongue is provided with a tubular metallic base portion 12 having a bifurcated hollow section 13 in which a tubular metallic tongue 14 is bolted, the upper end of the tongue being provided with the usual transverse handles (not shown). The tongue is provided with an angular extension 15 which extends across the axis of the steering post and is utilized to actuate the lifting mechanism for the load supporting means as will hereinafter be described.

The load supporting means comprises a preferably skeleton frame comprising side bars 16 preferably located respectively vertically above and parallel to the side bars 1 and connected at their rear ends by an angle bar 17 and at their front ends by a casting having a horizontal portion 18 forming a girder and a vertical extension 19 having at its upper end ears 20 in which a shaft 21 forming a fulcrum for the levers of the lifting mechanism is mounted.

The lifting mechanism for the front end of the truck comprises a supporting lever 22 having a fulcrum shaft 23 which is mounted in suitable bearings 24 in brackets or bosses upon rearward extensions of the head 4 which are secured to the side bars of the frame. The lifting lever 22 is provided with another shaft 25 which is mounted in brackets or bosses 26 extending downwardly from the horizontal girder 18 which connects the front ends of the side bars 16 of the load supporting mechanism. The end portion of the lever 22 is pivotally connected to a pair of links 27 which are arranged symmetrically with respect to the longitudinal axis of the frame and extends substantially vertically. The upper ends of the links 27 are pivotally connected by a short shaft 28 to a sector-shaped lever 29 which is pivoted upon the shaft 21 in the ears 20 at the upper end of the standard, and is provided at its free end with a series of ratchet teeth 30.

A lifting lever 31 is also pivotally mounted upon the shaft 21 and is of a length to extend across the vertical axis of the steering post throughout the greater portion of the movement of the lever. The lever 31 is bifurcated at its rear end and the arms 32 thereof lie upon opposite sides and closely adjacent to the sector-shaped lever 29. A dog 33, which is located between the arms 32 of the lifting lever 31, is rigidly secured to a shaft 34 having a weighted handle 35 which tends to hold the dog in engagement with the teeth of the ratchet 30. The front end of the lever 31 is connected by a universal joint 36 to the upper end of a strut 37, the lower end of which is pivotally connected to the tongue extension 15 substantially in line with the axis of the steering post.

By reason of this construction downward swinging movements of the tongue when in any steering position will swing the lever 31 about its fulcrum 21. Upon the upward swinging movements of the tongue the dog 33 will ride over the teeth of the ratchet 30 and upon downward swinging movement of the tongue will engage the teeth, thereby raising the sector lever 29 and through the links 27 will raise the front end of the supporting lever 22, thereby raising the front end of the load supporting means substantially vertically.

Novel lever mechanism is provided in this construction for raising the rear end of the load supporting means to a maximum height commensurate with the proportions of the arms of the levers. As illustrated herein the lever 22 is provided with a downward and rearward extension 38, the lower end of which is pivotally connected to a link 39 which extends along the longitudinal axis of the truck and desirably is adjustably connected by a turnbuckle 40 to an upwardly extending bifurcated arm 41 of a bell crank lever. The bell crank lever desirably is in the form of a sleeve shaft 42 having the upwardly extending arms 41 and preferably rearwardly extending arms 43 pivotally connected by a shaft 44 to the lower end of a web link 45, the upper ends of which are pivotally mounted upon a shaft 46 which is mounted in the rear end of the load supporting means.

The bell crank lever is so arranged that the upwardly extending arms 41 will swing across the vertical plane of the axis of the rear axle so that the upper end thereof will have a substantially horizontal movement, while the other arms 43 of the bell crank lever will be caused to move through a substantially vertical arc, thereby lifting the rear end of the load supporting means substantially vertically and to a maximum height commensurate with the relative proportions of the arms of the bell crank lever and the downwardly extending arm 38 of the supporting lever 22.

By reason of this construction the load supporting means can be moved higher relatively to the frame than in usual trucks of this type heretofore constructed which is advantageous where the truck is required to pass over thresholds, or other obstructions which might otherwise engage the depending legs of platforms which are usually transported by such trucks.

By reason of the adjustability of the length of the link 39 through the turnbuckle 40, the bell crank lever can be properly positioned to synchronize the vertical movement of the rear end with that of the front end of the load supporting means.

This novel construction is greatly advantageous over trucks of this type which have heretofore been constructed.

One of the principal objects of the invention is to provide means for locking the load supporting means in elevated position which may be easily released, notwithstanding the weight of the load, and which is arranged symmetrically with respect to the longitudinal axis of the truck to avoid twisting strains upon the frame and upon the load supporting means when heavily loaded and in elevated position, and a further object of the invention is to provide means for cushioning the descent of the load upon release of the locking means which is positioned in the longitudinal central plane of the truck, so that twisting strains are avoided during the descent of the load.

The mechanism for accomplishing this purpose comprises a ratchet which is connected to and movable substantially vertically with the load supporting means, and a co-operating locking dog having a rotatable member to engage successive teeth of the ratchet as the load supporting means is raised step by step. It also comprises a dash pot for checking the descent of the load supporting means and preferably the ratchet is fixedly secured to or formed integral with the piston of the dash pot.

As illustrated herein the dash pot comprises a cylinder 47 having a closed bottom provided with a downwardly extending boss 48 which is pivotally mounted upon a shaft 49 carried by bosses 50 upon the cross girder of the head. The piston 51, which reciprocates in the cylinder 47, is provided at its upper end with a lug or ear 52 which is pivotally connected by the shaft 28 to the sector-shaped lever 29 of the lifting mechanism.

The dash pot may be and desirably is similar to the dash pot illustrated in the Lovejoy Patent No. 1,445,838 above mentioned, and is adapted to interpose a resistance to the descent of the load substantially proportional to the weight of the load.

The piston has connected to it or formed integral with it a locking rack provided with a series of teeth 53 presenting substantially horizontal lower faces or shoulders.

The axes of the cylinder and piston of the dash pot are positioned in the central longitudinal vertical plane of the truck. The co-operating locking dog comprises a pair of arms 54 which are pivotally connected at their lower ends upon a shaft 55 which is mounted in bosses 56 extending rearwardly from the front arch of the head 4. The arms 54 desirably are connected by transverse webs 57 to provide an integral structure. The upper ends of the arms 54 are provided with bosses 58 in which the rotary ratchet-engaging member is mounted. This rotary ratchet-engaging member preferably is in the form of a shaft 59. A collar 60, which is fixedly secured to one end of the shaft, is provided with an arm 61 having a laterally extending stud 62, thus providing a crank by which the shaft may be rotated.

Any suitable means may be provided for rotating the shaft in a direction to cause the rolling engagement with the engaged tooth of the ratchet to release it from such engagement. Preferably this is accomplished by a lever 63 which is pivotally mounted at its lower end upon the shaft 55 upon which the locking dog is also pivoted. The lever 63 has a rearwardly extending boss 64 provided with a slot 65 which receives the stud 62 of the crank arm 61. The spring 66, which is connected at its lower end to an inwardly extending lug 67 on the lever 63 and at its upper end to the lifting lever 31, tends to hold the lever in a rearward position, while a similar spring 68, which is connected at its lower end to one of the arms 54 of the locking dog and at its upper end to the lifting lever 31, tends to hold the shaft 59 of the dog in engagement with the ratchet.

In the operation of the device, therefore, vertical swinging movements of the tongue when the pawl 33 is engaged by the ratchet 30 will raise the load supporting means step by step, the load supporting means being locked at each step of elevation by the engagement of the shaft 59 of the dog with the shoulder of a ratchet tooth 53. When the load supporting means has been raised to its maximum elevation by final depression of the tongue, and the tongue again raised, the dog 33 will be caused to pass beneath the lower foot of the ratchet by gravity, thus releasing the lifting lever from engagement with the sector-shaped lever and freeing the tongue for steering purposes. When it is desired to lower the load supporting means, the upper end of the releasing lever 63 is grasped by the operator and pulled forwardly, thereby causing the wall of the slot in the lever to engage the stud 62 upon the shaft of the locking dog and rotate the shaft in a direction to cause the rolling engagement of the shaft, with the flat face of the tooth, to move the dog forwardly until the shaft rolls out of engagement with the tooth, thus permitting the descent of the load supporting means. By reason of the rolling contact between the shaft of the dog and the tooth of the ratchet, the locking mechanism can be easily released. Furthermore, such rolling engagement avoids any substantial wear between the interengaging members of the dog and ratchet, thus overcoming the serious defects of previous constructions.

When the dog is thus released the descent of the load supporting means is immediately cushioned by the dash pot which is secured to or integral with the ratchet of the locking mechanism.

A further important object of the invention is to provide means for preventing the tongue from flying when the load supporting means is released from elevated position. This is accomplished in the present invention by providing means which will limit the movement of the releasing lever 63 sufficiently to prevent disengagement of the locking dog unless the tongue is in substantially vertical position. In the preferred construction illustrated the lifting lever 63 is provided near its upper end with a boss 69 which extends inwardly toward the central plane of the truck and the lifting lever 31 is provided with a co-operating outwardly extending boss 70 which lies in the path of the lug 69 at all times except when the front end of the lifting lever is in lowered position, which only occurs when the tongue is in substantially vertical position. It, therefore, follows that whenever, during the lifting operation, the tongue is depressed to load-lifting position, as illustrated in dotted lines in Fig. 1, forward movement of the lever 63 sufficient to release the locking mechanism will be prevented, but when the tongue is in substantially vertical position, as illustrated in full lines in Fig. 1, with the locking dog engaging any of the teeth of the ratchet, the releasing lever 63 may be operated to rotate the shaft 59 of the locking dog to release it from engagement with the ratchet.

By virtue of the present invention, therefore, an easily releasable locking means is provided which is fool-proof, and cannot be improperly operated in such a manner as to subject the operator to the danger of a flying tongue.

It will be understood that the particular embodiment of the invention shown and described herein is of an illustrative character and is not restrictive, and that various changes in form, construction and arrangement of parts may be made within the spirit and scope of the following claims.

Having thus described the invention, what is claimed as new, and desired to be secured by Letters Patent, is:

1. An elevating truck comprising load supporting means, means for raising said load supporting means, means for locking said load supporting means in raised position comprising relatively movable co-operating locking members on said load supporting means and a stationary portion of said truck and having respectively a shoulder and a rotatable member to engage said shoulder, and means for rotating said rotatable member in a direction to cause the rolling contact with said shoulder to release the same therefrom.

2. An elevating truck comprising a frame, load supporting means, means for raising said load supporting means step by step, means for locking said load supporting means in raised position comprising relatively movable co-operating locking members on said load supporting means and said frame and having respectively a ratchet and a rotatable member positioned to engage successive teeth of said ratchet to lock said load supporting means at each step of elevation, and means for rotating said rotatable means in a direction to cause the rolling contact with said shoulder to release the same.

3. An elevating truck comprising a frame, load supporting means, means for raising said load supporting means step by step, means for locking said load supporting means in raised position comprising relatively movable co-operating locking members on said load supporting means and said frame including a ratchet mounted upon one of said movable members and a rotatable shaft mounted upon the other movable member positioned to engage successive teeth of said ratchet to lock said load supporting means at the respective steps of elevation, and means for rotating said shaft in a direction to cause the rolling contact with the engaged tooth of the ratchet to release the engagement therebetween.

4. An elevating truck comprising a main frame, steering mechanism having a tongue mounted to swing vertically, load supporting means, lifting means operable by vertical swinging movements of said tongue to raise said load supporting means substantially vertically step by step, means for locking the load supporting means at each step of elevation including a ratchet movable with said load supporting means, a dog pivotally mounted on said frame having at its upper end a shaft positioned to engage the teeth of said ratchet, and means for rotating said shaft in a direction to cause the rotating contact thereof with the engaged tooth of the ratchet to release the same from such engagement.

5. An elevating truck comprising a main frame, steering mechanism having a tongue mounted to swing vertically, load supporting means, lifting means operable by vertical swinging movements of said tongue to raise said load supporting means substantially vertically step by step, means for locking the load supporting means at each step of elevation including a ratchet movable with said load supporting means, a dog pivotally mounted on said frame having at its upper end a shaft positioned to engage the teeth of said ratchet, means including a hand-operated lever for rotating said shaft in a direction to cause the rolling contact thereof with the engaged tooth of said ratchet to release it from such engagement.

6. An elevating truck comprising load supporting means, means operable by a vertical swinging movement of the tongue to raise said load supporting means, means for locking the load supporting means in elevated position, a hand-operated device for releasing said locking means, and means for preventing actuation of said releasing means unless the tongue is in substantially vertical position.

7. An elevating truck comprising a main frame, steering mechanism having a tongue mounted to swing vertically, load supporting means, lifting means operable by vertical swinging movements of said tongue to raise said load supporting means step by step, a ratchet movable with said load supporting means, a dog pivotally mounted on said frame having at its upper end a shaft positioned to engage the teeth of said ratchet, means including a hand-operated lever for rotating said shaft in a direction to cause the rolling contact thereof with the engaged tooth of said ratchet to release it from such engagement, and means for preventing sufficient movement of said lever to release the dog from said ratchet unless the tongue is in substantially vertical position.

8. An elevating truck comprising a main frame, steering mechanism having a tongue mounted to swing vertically, load supporting means, lifting means operable by vertical swinging movements of said tongue to raise said load supporting means step by step, a ratchet movable with said load supporting means, a dog pivotally mounted on said frame having at its upper end a shaft positioned to engage the teeth of said ratchet, and provided with an eccentrically positioned stud, a releasing lever pivotally mounted on said frame having means to engage said stud operable upon swinging movement of said releasing lever to rotate said dog in a direction to cause the rolling contact thereof with the engaged tooth of the ratchet to release it from such engagement, and an abutment upon a movable member of said lifting means normally positioned in the path of said lever adapted to prevent sufficient movement of said lever to release said shaft from engagement with said ratchet, unless the tongue is in substantially vertical position.

9. An elevating truck comprising a main frame, load supporting means, means for raising said load supporting means step by step, means for locking said load supporting means at each step of elevation and for cushioning the descent of said load supporting means comprising a substantially vertical dash pot mounted upon the frame and centrally of the width of said frame having a piston connected to and movable with said load supporting means, a ratchet on said piston, a locking dog pivotally mounted upon said frame to engage said ratchet, and means for releasing said dog from such engagement.

10. An elevating truck comprising a main frame, load supporting means, means for raising said load supporting means step by step, means for locking said load supporting means at each step of elevation and for cushioning the descent of said load supporting means comprising a substantially vertical dash pot mounted upon and centrally of the width of said frame having a piston connected to and movable with said load supporting means, a ratchet on said piston, a locking dog pivotally mounted upon said frame having at its upper end a rotatable shaft to engage the teeth of said ratchet, and means for rotating said shaft in a direction to cause the rolling contact thereof with the teeth of said ratchet to release it from engagement therewith.

11. An elevating truck comprising a main frame, steering mechanism including a tongue mounted to swing vertically, and load supporting means having a front standard, means for elevating said load supporting means including a lifting lever pivotally mounted upon said standard and extending over the axis of said steering mechanism, a connection between said tongue and said lever movable substantially in line with the axis of said steering mechanism whereby vertical swinging movement of the tongue when in any steering position will raise the platform, a ratchet movable with said load supporting means, a dog pivotally mounted on said frame having at its upper end a shaft positioned to engage the teeth of said ratchet, a hand-operated lever for rotating the shaft in a direction to cause the rolling contact thereof with the engaged tooth of said ratchet to release it from such engagement, and interengaging means upon said tongue and said lifting lever operable to prevent releasing movement of said lever unless the tongue is in substantially vertical position.

12. An elevating truck comprising a main frame having at its rear end an axle with wheels mounted thereon and at its front end steering mechanism, load supporting means, a supporting lever fulcrumed upon said frame extending forwardly and pivotally connected to said load supporting means and having a rearwardly and downwardly extending arm substantially normal thereto, means for lifting the front end of said supporting lever and thereby to raise the front end of said load supporting means, a bell crank lever fulcrumed upon the rear axle having a vertically disposed arm the upper end of which is movable across the vertical plane of its pivot, and an arm substantially at right angles thereto movable through a substantially vertical arc, a vertical link connecting said arm to said load supporting means, and means connecting the downwardly extending arm of the load supporting lever to the end portion of the vertically disposed arm of said bell crank lever, whereby upon lifting movement of said supporting lever a maximum vertical movement will be imparted to said load supporting means commensurate with the relative leverages of said supporting lever and said bell crank lever.

13. An elevating truck comprising a main frame having at its rear end an axle with wheels mounted thereon and at its front end steering mechanism, load supporting means, a supporting lever fulcrumed upon said frame extending forwardly and pivotally connected to said load supporting means and having a rearwardly and downwardly extending arm substantially normal thereto, means operable by a vertical swinging movement of said tongue to lift the front end of said supporting lever and thereby to raise the front end of said load supporting means, a bell crank lever fulcrumed upon the rear axle having a vertically disposed arm the upper end of which is movable across the vertical plane of its pivot and an arm substantially at right angles thereto movable through a substantially vertical arc, a vertical link connecting said arm to said load supporting means, a link connecting the downwardly extending arm of the load supporting lever to the end portion of the vertically disposed arm of said bell crank lever, whereby upon lifting movement of said supporting lever a maximum vertical movement will be imparted to said load supporting means commensurate with the relative leverages of said supporting lever and said bell crank lever, and means for adjusting the length of said link to equalize the vertical movements of the front and rear ends of said load supporting means.

14. An elevating truck comprising a main frame having at its rear end an axle with wheels mounted thereon and at its front end steering mechanism, load supporting means, a supporting lever fulcrumed on said frame extending forwardly and pivotally connected to said load supporting means and having a rearwardly and downwardly extending arm substantially normal thereto, means operable by a vertical swinging movement of said tongue acting by tension to lift the front end of said load supporting lever and thereby to raise the front end of said load supporting means vertically, a bell crank lever fulcrumed on the rear axle having an upwardly extending arm the upper end of which is movable transversely across the vertical plane of said rear axle, and an arm substantially at right angles thereto, a vertical link connecting said arm to said load supporting means, a link pivotally connecting the downwardly extending arm of said lifting lever to the upwardly extending arm of said bell crank lever, whereby upon lifting movement of said supporting lever a maximum vertical movement will be imparted to said load supporting means commensurate with the relative leverages of said lifting lever and bell crank lever.

15. An elevating truck comprising a main frame having at its rear end an axle with wheels mounted thereupon in proximity to the side bars of the frame and at its front end steering mechanism having a pair of widely separated wheels and provided with a tongue mounted to swing vertically, load supporting means, a supporting lever fulcrumed on said frame and pivotally connected to said load supporting means operable to raise the front end of said load supporting means substantially vertically and having an arm extending downwardly substantially normal thereto, means operable by vertical swinging movements of said tongue acting by tension upon said supporting lever upon opposite sides of and symmetrically with respect to the longitudinal axis of the truck to raise the front end of said load supporting means substantially vertically, a bell crank lever fulcrumed upon said rear axle having an upwardly extending arm and an arm extending rearwardly substantially at right angles to said arm, a link extending longitudinally of the center of said truck connecting the upwardly extending arm of said bell crank lever to the downwardly extending arm of said supporting lever, and a link connected with the substantially horizontal arm of said bell crank lever and to said load supporting means at points symmetrical with respect to the longitudinal axis of the truck, operable upon actuation of said supporting lever to raise the rear end of said load supporting means substantially vertically.

In testimony whereof, I have signed my name to this specification.

DANIEL E. HENNESSY.